(12) United States Patent
Wang et al.

(10) Patent No.: US 7,155,181 B2
(45) Date of Patent: Dec. 26, 2006

(54) HIGH SENSITIVITY RF RECEIVER AND METHOD FOR FORMING THE SAME

(75) Inventors: Li-Yueh Wang, Hsinchu (TW); Tao-Kei Li, Hsinchu (TW)

(73) Assignee: Windbond Electronics Corp., Hsinchu (TW)

( * ) Notice: Subject to any disclaimer, the term of this patent is extended or adjusted under 35 U.S.C. 154(b) by 255 days.

(21) Appl. No.: 10/904,406

(22) Filed: Nov. 9, 2004

(65) Prior Publication Data
US 2006/0039508 A1 Feb. 23, 2006

(30) Foreign Application Priority Data
Aug. 20, 2004 (TW) ............................... 93125067 A

(51) Int. Cl.
*H04B 7/00* (2006.01)
*H04L 27/22* (2006.01)

(52) U.S. Cl. ...................... 455/130; 455/259; 455/296; 375/329

(58) Field of Classification Search ........ 455/313–314, 455/323, 334, 130, 73, 76–77, 101, 151.3, 455/164.1, 164.2, 165.1, 183.1, 232.1, 234.1, 455/248.1, 254.4, 255–260; 375/329, 130, 375/376, 373–375
See application file for complete search history.

(56) References Cited

U.S. PATENT DOCUMENTS

| | | | | |
|---|---|---|---|---|
| 6,144,292 A | * | 11/2000 | Brown | 455/402 |
| 6,396,890 B1 | * | 5/2002 | Turner | 375/376 |
| 2004/0198288 A1 | * | 10/2004 | Sadowski | 455/259 |
| 2005/0009485 A1 | * | 1/2005 | Tanaka | 455/193.1 |
| 2006/0039449 A1 | * | 2/2006 | Fontana et al. | 375/130 |
| 2006/0062277 A1 | * | 3/2006 | Friedrich et al. | 375/130 |
| 2006/0205374 A1 | * | 9/2006 | Darabi et al. | 455/259 |

* cited by examiner

*Primary Examiner*—Pablo N. Tran
(74) *Attorney, Agent, or Firm*—Jianq Chyun IP Office

(57) ABSTRACT

A method for improving sensitivity of a RF receiver and a RF receiver designed by the same are provided. The RF receiver, which receives a RF signal, comprises a sampling converting circuit, a decoding circuit, a frequency-hopping circuit, a constant current source and a ring oscillating circuit. The RF receiver outputs a frequency-hopping signal to the frequency-hopping circuit when the decoding circuit determines that the digital data converted from the RF signal is not equivalent to each of the internal preset data. The frequency-hopping circuit outputs a frequency-hopping current to the ring oscillating circuit to change a sampling clock of the RF receiver.

15 Claims, 8 Drawing Sheets

| supplied voltage 2.5V | | test 1 | test 2 |
|---|---|---|---|
| harmonic 1(dBm) | | -50.4 | -44 |
| harmonic 2(dBm) | | -51.6 | -44.6 |
| QNCH(KHz) | | 370 | 430 |
| sensitivity of the receiver with an input frequency 49.86MHz(dBm) | w/o harmonic | -90 | -90 |
| | w/ harmonic | -90 | -90 |
| improvement(dB) | | 0 | 0 |
| sensitivity of the receiver with the harmonic 1 (dBm) | w/o harmonic | -87 | -85 |
| | w/ harmonic | -90 | -89 |
| improvement(dB) | | 3 | 4 |
| sensitivity of the receiver with the harmonic 2 (dBm) | w/o harmonic | -86 | -84 |
| | w/ harmonic | -89 | -88 |
| improvement(dB) | | 3 | 4 |

FIG. 5

HIGH SENSITIVITY RF RECEIVER AND METHOD FOR FORMING THE SAME

CROSS-REFERENCE TO RELATED APPLICATION

This application claims the priority benefit of Taiwan application Ser. No. 93125067, filed on Aug. 20, 2004.

BACKGROUND OF THE INVENTION

1. Field of the Invention

The present invention relates to a radio-frequency (RF) receiver, and more particularly, to a RF receiver and a method of improving sensitivity of a RF receiver by reducing the interference of digital noises.

2. Description of the Related Art

With the advancement of integrated circuits in the telecommunication industry, various electronic devices have been developed. These electronic devices comprise high-power communication devices such as cellular phones, wireless communication devices, or low-power communication devices such as remote-controlled toys.

The 1-GHz low-power CMOS super-regenerative receiver is disclosed in p.440, vol. 36, JSSC, from the Institute of Electrical and Electronic Engineers (IEEE). Wherein, the super-regenerative receiver is fabricated using the complementary metal-oxide-semiconductor (CMOS) technology. The linear mode further offers better selectivity of the receiver. The super-regenerative receiver, however, cannot screen the coupling noise generated from other circuits in the receiver. As the integrated circuit technology is highly developing, if more circuits are integrated in a single chip, the base noise will substantially limit the efficiency of the receiver.

FIG. 7 is a schematic circuit block diagram showing a conventional RF receiver. The RF receiver 70, i.e. the super-regenerative receiver, comprises a RF receiving terminal 702, an oscillating circuit 704, a filter rectifying circuit 706, a slicer circuit 708, a decoding circuit 712, a constant current control circuit 718, an input/output circuit 720, a ring oscillating circuit 716 and a constant current source 714. Wherein, the constant current source 714 is electrically coupled to the voltage source. In the conventional RF receiver 70, the trigger time for the oscillating circuit 704 depends on the intensity of the received signal. Further, the RF receiver 70 converts the inputted RF signal to 1 or 0. After the noise is filtered by the filter rectifying circuit 706, the RF signal is then outputted to the slicer circuit 708. The slicer circuit 708 converts the RF signal from analog into digital data, and outputs the digital data to the decoding circuit 712. Then, the current controller 718 and the input/output circuit 720 output a constant current according to the control signal from the decoding circuit 712 even when different voltages are applied to the integrated circuits. The constant current source 714 provides a constant current to the ring oscillating circuit 716. The ring oscillating circuit 716 provides a sampling frequency to the oscillating circuit 704, the filter rectifying circuit 706, the slicer circuit 708 and the decoding circuit 712.

In the conventional technology, if a noise collides with a received RF signal, and the frequency of two signals are overlapped, the RF receiver 70 cannot identify whether the received signal is 1 or 0. The sensitivity of the RF receiver thus deteriorates. The noise at the RF receiving terminal 702 is a digital harmonic signal. Due to the temperature variations, voltage changes or vibrations, the digital clock may shift, causing the digital harmonic signal to collide with the input signal. As a result, the RF receiver 70 becomes unstable. When the RF receiver 70 in a remote-controlled toy is unstable, the toy cannot be controlled according to the given instructions.

SUMMARY OF THE INVENTION

Accordingly, the present invention is directed to a radio-frequency (RF) receiver. When the decoder determines that the received digital data are different from the internal preset data, the RF receiver transmits a frequency-hopping signal, causing a sampling frequency to hop, whereby the collision of the RF signal and the sampling frequency can be avoided.

The present invention is also directed to a method for improving sensitivity of a RF receiver, wherein it is determined whether the received digital data are different from the internal preset data, then it is decided whether the frequency-hopping signal should be transmitted for the sampling frequency to hop.

The present invention provides a RF receiver for receiving RF signals. The RF receiver comprises a sampling converting circuit, a decoding circuit, a frequency-hopping circuit, a constant current source and a ring oscillating circuit. The sampling converting circuit receives a RF signal to sample and outputs a digital data after processing by a filter rectifying circuit of a slicer circuit. The decoding circuit receives the digital data and compares the digital data with a plurality of internal preset data in the decoding circuit, so when the digital data is different from each of the preset data, the decoding circuit outputs a frequency-hopping signal. The frequency-hopping circuit outputs a frequency-hopping current while receiving the frequency-hopping signal. The constant current source outputs a constant current. While receiving the frequency-hopping current, the ring oscillating circuit performs a frequency hopping operation on frequency-hopping current and the constant current to output a frequency-hopped sampling frequency.

According to an embodiment of the present invention, the frequency-hopping circuit comprises a frequency-hopping current source and a switch. The frequency-hopping current source outputs the frequency-hopping current. While receiving the frequency-hopping signal, the switch connects the frequency-hopping current source to the ring oscillating circuit to transmit the frequency-hopping current to the ring oscillating circuit.

According to an embodiment of the present invention, when the digital data are equivalent to one of the preset data, the decoding circuit outputs a control signal. According to the control signal, the current controlling circuit outputs the operating current.

According to an embodiment of the present invention, the current controlling circuit comprises a first switch, a second switch, a third switch, a first transistor, a high-critical voltage inverter, a second transistor, a pulse circuit and a diode module. The first switch is coupled to a voltage source. The second switch is controlled by the control signal. A gate terminal of the first transistor is coupled to the first switch, a source terminal of the first transistor is coupled to the voltage source, and a drain terminal of the first transistor is coupled to the output terminal of the current controlling circuit. The high-critical voltage inverter receives the control signal. A gate terminal of the second transistor is coupled to the high-critical voltage inverter, a source terminal of the second transistor is grounded, and a drain terminal of the second transistor is coupled to the output terminal of the current controlling circuit. The pulse circuit is coupled to the third switch, generating a pulse signal to control the third switch to pulse output an amplified current. The diode module is coupled to the gate terminal of the first transistor and the voltage source. The diode module comprises a plurality of diodes. Wherein, the first switch and the second switch output currents according to the control signal.

According to an embodiment of the present invention, the frequency-hopping current is less than 1% of the constant current.

The present invention also discloses a method for improving sensitivity of a radio-frequency (RF) receiver. The RF receiver generates a sampling frequency according to a constant current. The method starts by receiving a RF signal. Then the RF receiver samples the received RF signal according to the sampling frequency and analog-digital converts the sampled signal into digital data. Next, it is determined whether the digital data are equivalent to a plurality of preset data. A frequency-hopping signal is generated to transmit a frequency-hopping current when the digital data are different from each of the preset data. Then, a frequency-hopping operation is performed on the frequency-hopping current and the constant current to output a frequency-hopped sampling signal. On the other hand, when the digital data are equivalent to one of the preset data, a control signal is outputted. According to the control signal, an operating current is outputted.

According to an embodiment of the present invention, the frequency-hopping current is less than 1% of the constant current.

According to an embodiment of the present invention, the frequency-hopping signal changes frequency once every two data frames.

In the present invention, the frequency-hopping circuit is applied in the RF receiver, so when the decoder determines that the received digital data are different from the preset data, the frequency-hopping signal is transmitted so the ring oscillator receives the frequency-hopping current. Therefore, the sampling frequency outputted from the ring oscillator is slightly hopped. Accordingly, the collision of the RF signal and the sampling frequency can be avoided.

The above and other features of the present invention will be better understood from the following detailed description of the embodiments of the invention that is provided in combination with the accompanying drawings.

BRIEF DESCRIPTION OF THE DRAWINGS

FIG. 5 is a configuration showing a testing result of a RF receiver according to an embodiment of the present invention.

DESCRIPTION OF THE EMBODIMENTS

Figure 1A:
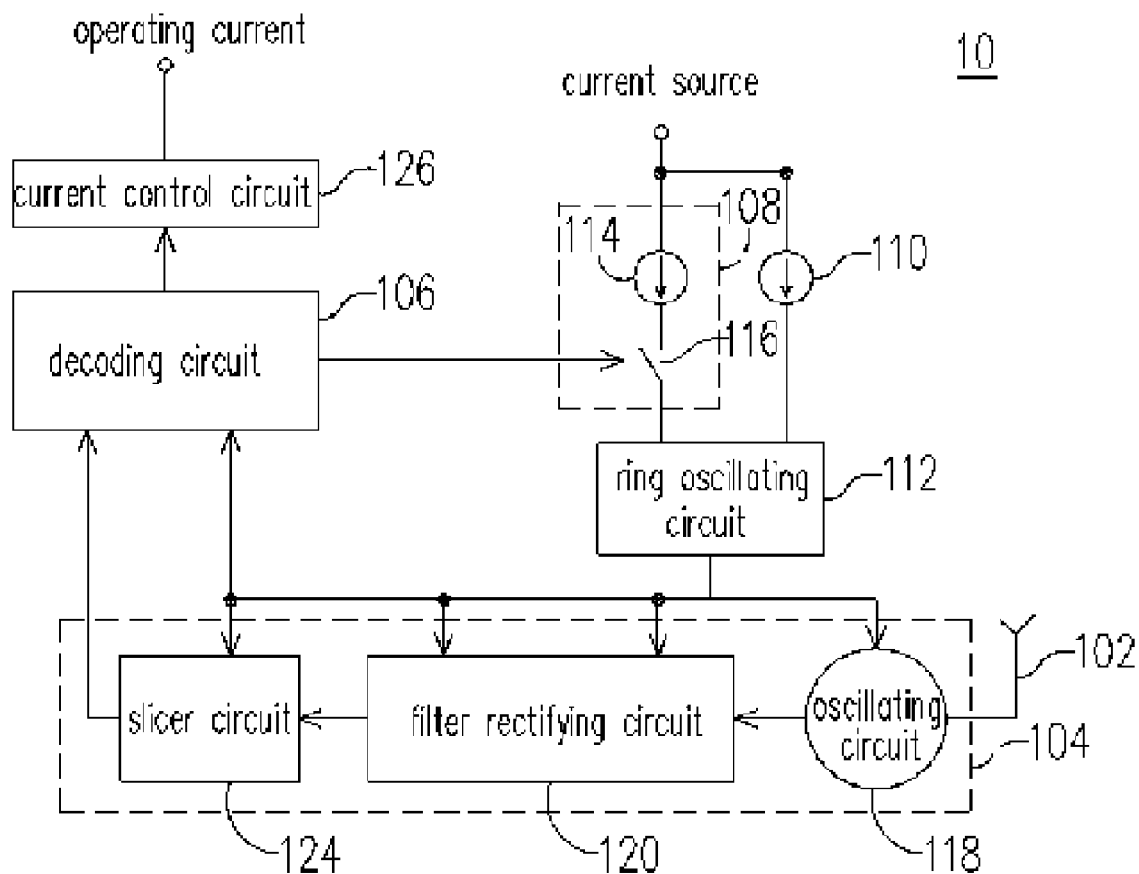
FIG. 1A is a block diagram showing a circuit of a radio-frequency (RF) receiver according to an embodiment of the present invention.

FIG. 1A is a block diagram showing a circuit of a radio-frequency (RF) receiver according to an embodiment of the present invention. The RF receiver 10 comprises a RF receiving terminal 102, a sampling converting circuit 104, a decoding circuit 106, a frequency-hopping circuit 108, a constant current source 110, a ring oscillating circuit 112 and the current control circuit 126. Wherein, the sampling converting circuit 104 comprises an oscillating circuit 118, a filter rectifying circuit 120 and a slicer circuit 124.

In this embodiment, the oscillating circuit 118 is electrically coupled to the ring oscillating circuit 112, receiving the RF signal from the RF receiving terminal 102 and the sampling frequency from the ring oscillating circuit 112, and outputting a trigger signal after performing a sampling operation on the received RF signal according to the received sampling frequency.

The filter rectifying circuit 120 is electrically coupled to the oscillating circuit 118 for filtering the noises in the trigger signal. The filter rectifying circuit 120 may, for example, cumulate different trigger signals in every quench cycle. One of ordinary skill in the art should know that the filter rectifying circuit 120 may comprise, for example, a low pass filter (LPF) (not shown) and a rectifier (not shown). The present invention, however, is not limited thereto.

The slicer circuit 124 is electrically coupled to the filter rectifying circuit 120 and the decoding circuit 106 to receive and convert the trigger signal into a digital data, which is then outputted to the decoding circuit 106.

In this embodiment, the decoding circuit 106 is electrically coupled to the slicer circuit 124. The decoding circuit 106 receives and compares the digital data with a plurality of internal preset data in the decoding circuit 106 to determine whether the digital data is equivalent to one of the preset data. When the digital data is different from each of the preset data, the decoding circuit 106 outputs the frequency-hopping signal to the frequency-hopping circuit 108. If the digital data is equivalent to one of the preset data, the decoding circuit 106 outputs the control signal to the current controlling circuit 126.

In this embodiment, the frequency-hopping circuit 108 comprises the frequency-hopping current source 114 and the switch 116. When receiving the frequency-hopping signal, the switch 116 is electrically coupled to the frequency-hopping current source 114 and the ring oscillating circuit 112, whereby the frequency-hopping current is transmitted to the ring oscillating circuit 112. Wherein, the frequency-hopping current can be, for example, less than 1% of the constant current. Accordingly, the base frequency of the RF signal is not affected.

The ring oscillating circuit 112 is electrically coupled to the frequency-hopping current source 114 and the constant current source 110, receiving the constant current transmitted from the constant current source 110. When the switch 116 is electrically coupled to the frequency-hopping current source 114 and the ring oscillating circuit 112, the ring oscillating circuit 112 also receives the frequency-hopping current. While receiving the frequency-hopping current, the ring oscillating circuit 112 performs a frequency-hopping operation on the frequency-hopping current and the constant current to output the frequency-hopped sampling frequency.

In this embodiment, the current controlling circuit 126 outputs the operating current according to the control signal.

Figure 1B:
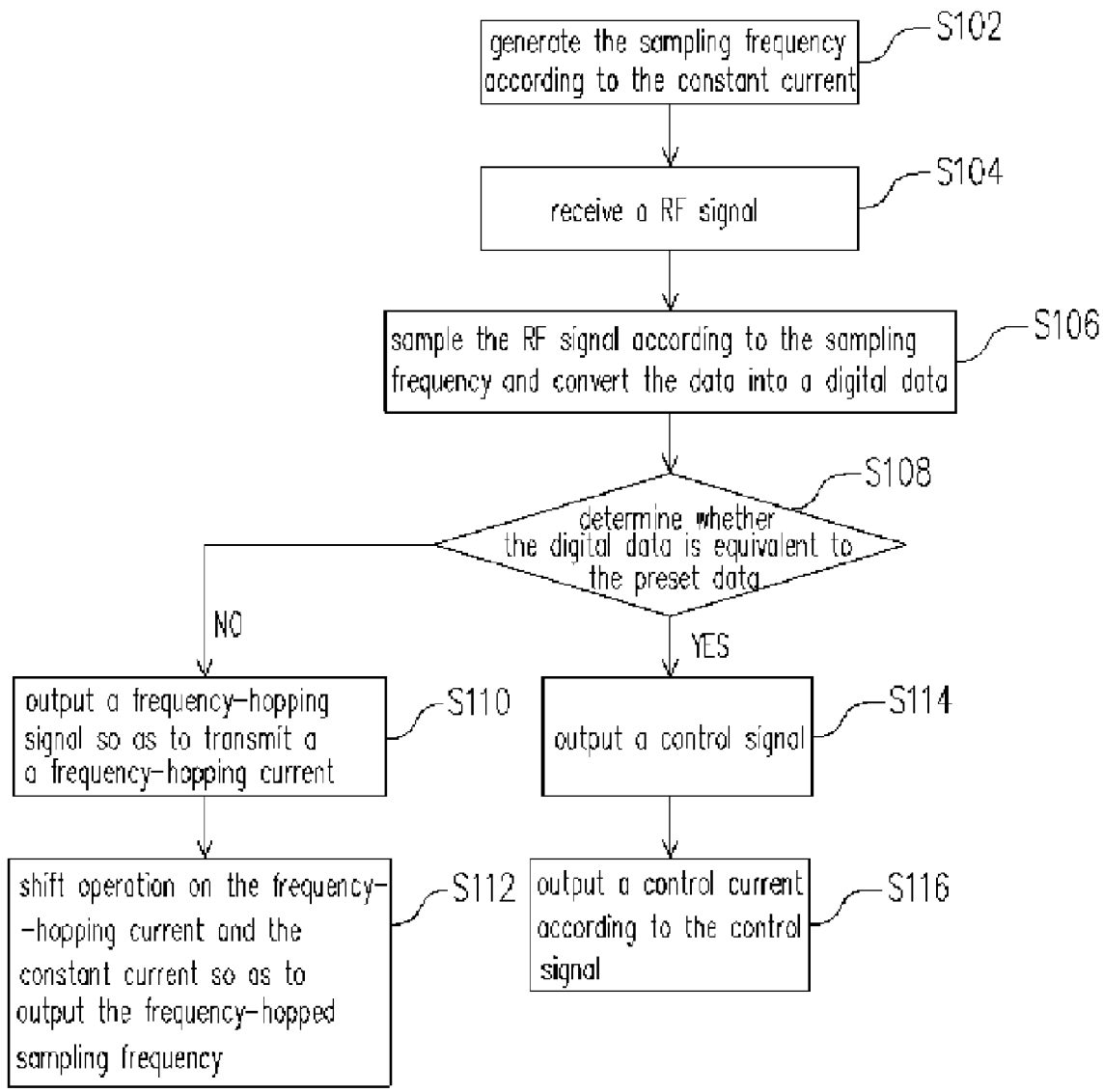
FIG. 1B is a flowchart showing a method of improving sensitivity of a RF receiver according to an embodiment of the present invention.

Please refer to FIGS. 1A and 1B. FIG. 1B is a flowchart showing a method of improving sensitivity of a RF receiver according to an embodiment of the present invention.

In the present embodiment, the RF receiver 10 generates the sampling frequency according to the constant current in step s102. In step s104, the RF receiving terminal 102 receives a RF signal. The oscillating circuit 118 samples the RF signal according to the sampling frequency. The filter rectifying circuit 120 filters the noises in the RF signal. Then the slicer circuit 124 converts the analog data into the digital data, outputting the digital data to the decoding circuit 106 in step s106.

The decoding circuit 106 determines whether the digital data is equivalent to any of the internal preset data in step s108. If the digital data is different from each of the preset data, the frequency-hopping signal is outputted to the switch 116 to connect the switch 116 to the frequency-hopping current source 114 and the ring oscillating circuit 112, and thus transmit the frequency-hopping current to the ring oscillating circuit 112 in step s110. Wherein, one of ordinary skill in the art should know that the frequency-hopping signal may change frequency once every two data frames. The present invention, however, is not limited thereto.

The ring oscillating circuit 112 then performs a frequency-hopping operation on the received frequency-hopping current and the constant current to output the frequency-hopped sampling frequency in step s112. The frequency-hopped sampling frequency, such as the digital-pulse harmonic, can prevent the overlapping of the two signal frequencies resulting from the collision with the RF signal.

If determining that the digital data is equivalent to one of the preset data, the decoding circuit 106 outputs the control signal to the current controlling circuit 126 to output the operating current.

Figure 2:
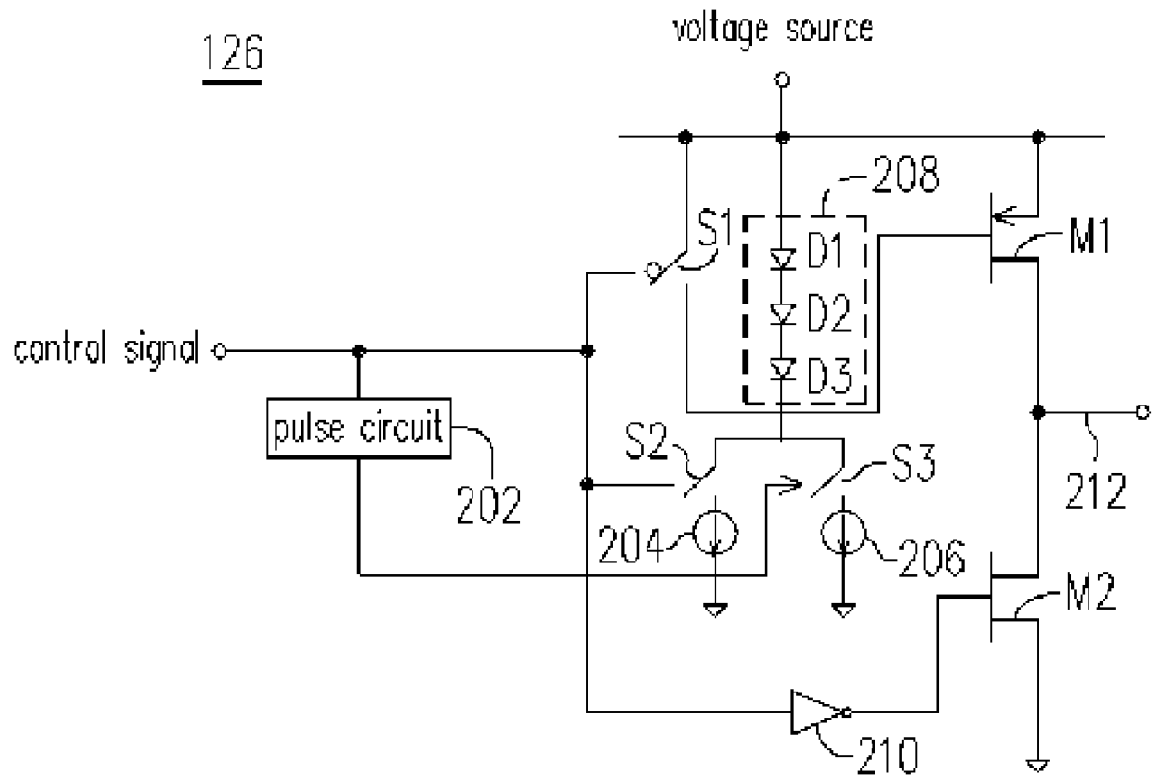
FIG. 2 is a schematic drawing showing a current controlling circuit of a RF receiver according to an embodiment of the present invention.

FIG. 2 is a schematic drawing showing a current controlling circuit of a RF receiver according to an embodiment of the present invention. With reference to FIG. 2, the current controlling circuit 126 comprises a pulse circuit 202, a first switch S1, a second switch S2, a third switch S3, a first transistor M1, a second transistor M2, a diode module 208, a high-critical voltage inverter 210, a small current source 204 and a big current source 206. The current controlling circuit 126 receives the control signal and outputs the operating current via the output terminal 212 thereof. The diode module 208 may comprise, for example, three diodes D1, D2 and D3.

The first switch S1 is coupled to the voltage source to, for example, receive an operating voltage, but not limited thereto. The second switch S2 is controlled by the control signal. The current input terminal of the diode module 208 is coupled to the voltage source. The current output terminal of the diode module 208 is coupled to the switches S2 and S3, and selectively coupled to the small current source 204 and the big current source 206. The gate terminal of the first transistor M1 is coupled to the first switch S1. The source terminal of the first transistor M1 is coupled to the voltage source. The drain terminal of the first transistor M1 is coupled to the output terminal 212 of the current controlling circuit 126. The gate terminal of the second transistor M2 is coupled to the signal output terminal of the high-critical voltage inverter 210. The source terminal of the second transistor M2 is grounded. The drain terminal of the second transistor M2 is coupled to the output terminal 212 of the current controlling circuit 126. The signal input terminal of the high-critical voltage inverter 210 receives the control signal. The pulse circuit 202 is coupled to the third switch S3, generating the pulse signal to control the third switch S3 so as to pulse output an amplified current.

The first switch S1 and the second switch S2 output the currents according to the control signal.

Figure 3:
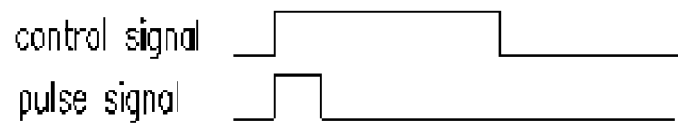
FIG. 3 is a configuration showing clock sequences of a control signal and a pulse signal in a current controlling circuit according to an embodiment of the present invention.

In this embodiment, when different voltages are applied, the diodes D1–D3 are used to maintain the same gate voltage Vgs on the first transistor M1 so the first transistor M1 has the constant driving force. The switches S1 and S2 are controlled by the control signal as shown in FIG. 3. The switch S3 is controlled by the pulse signal outputted from the pulse circuit 202 to pulse output the amplified current shown in FIG. 3.

When the output terminal 212 of the current controlling circuit 126 outputs a high-logic voltage, the control signal turns on the current source 204 and then the first transistor M1 is turned on so the output terminal 212 can output a high-logic voltage. Meanwhile, the pulse signal turns on the current source 206 so as to enhance the slew rate. When the output terminal 212 of the current controller 126 outputs a low-logic voltage, the first switch S1 and the first transistor M1 are turned off. The high-critical voltage inverter 210 is used to reduce the generation of small currents.

Figure 4A:
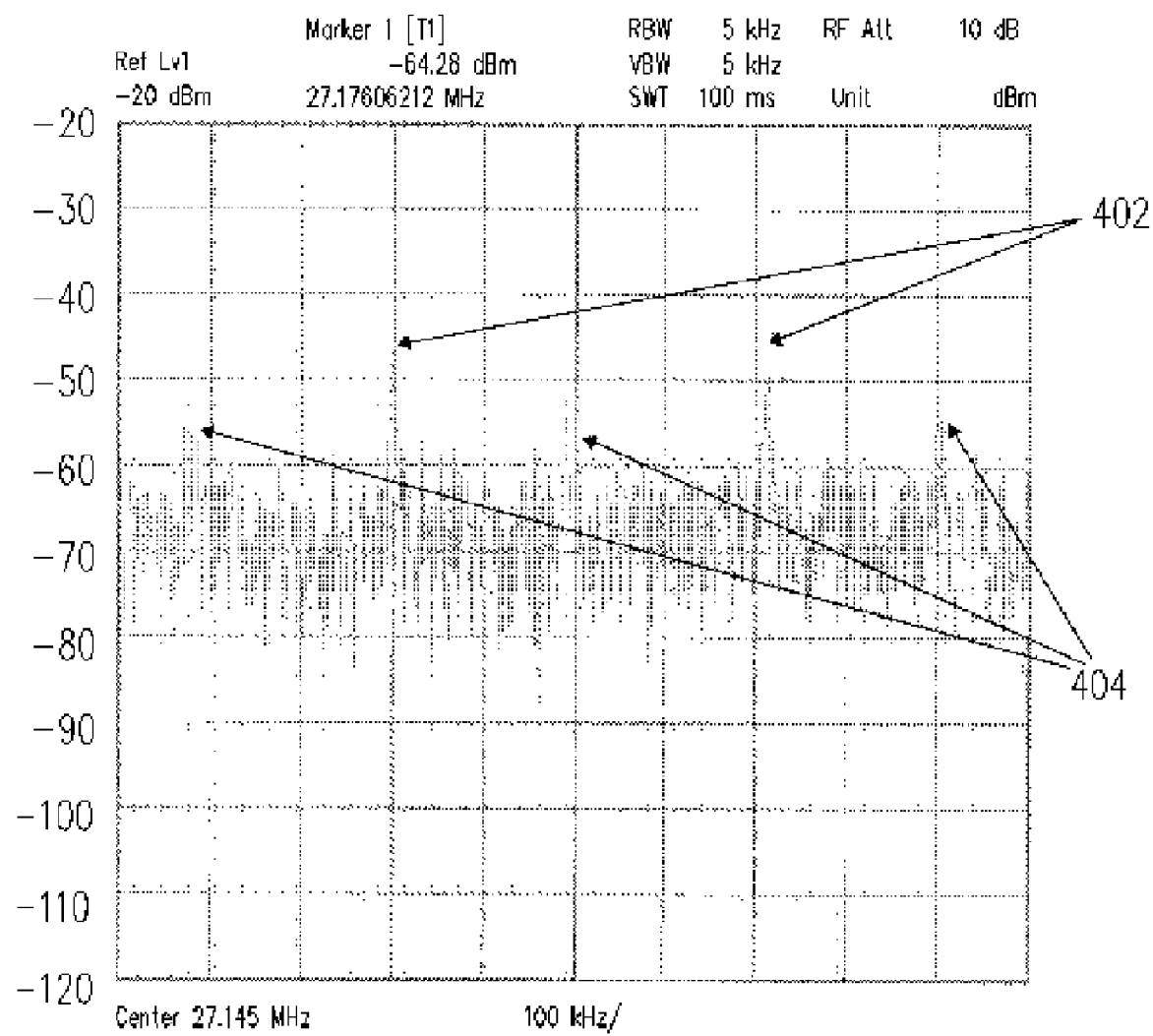
FIG. 4A is a configuration showing a spectrum of a RF signal and a base noise according to an embodiment of the present invention.
Figure 4B:
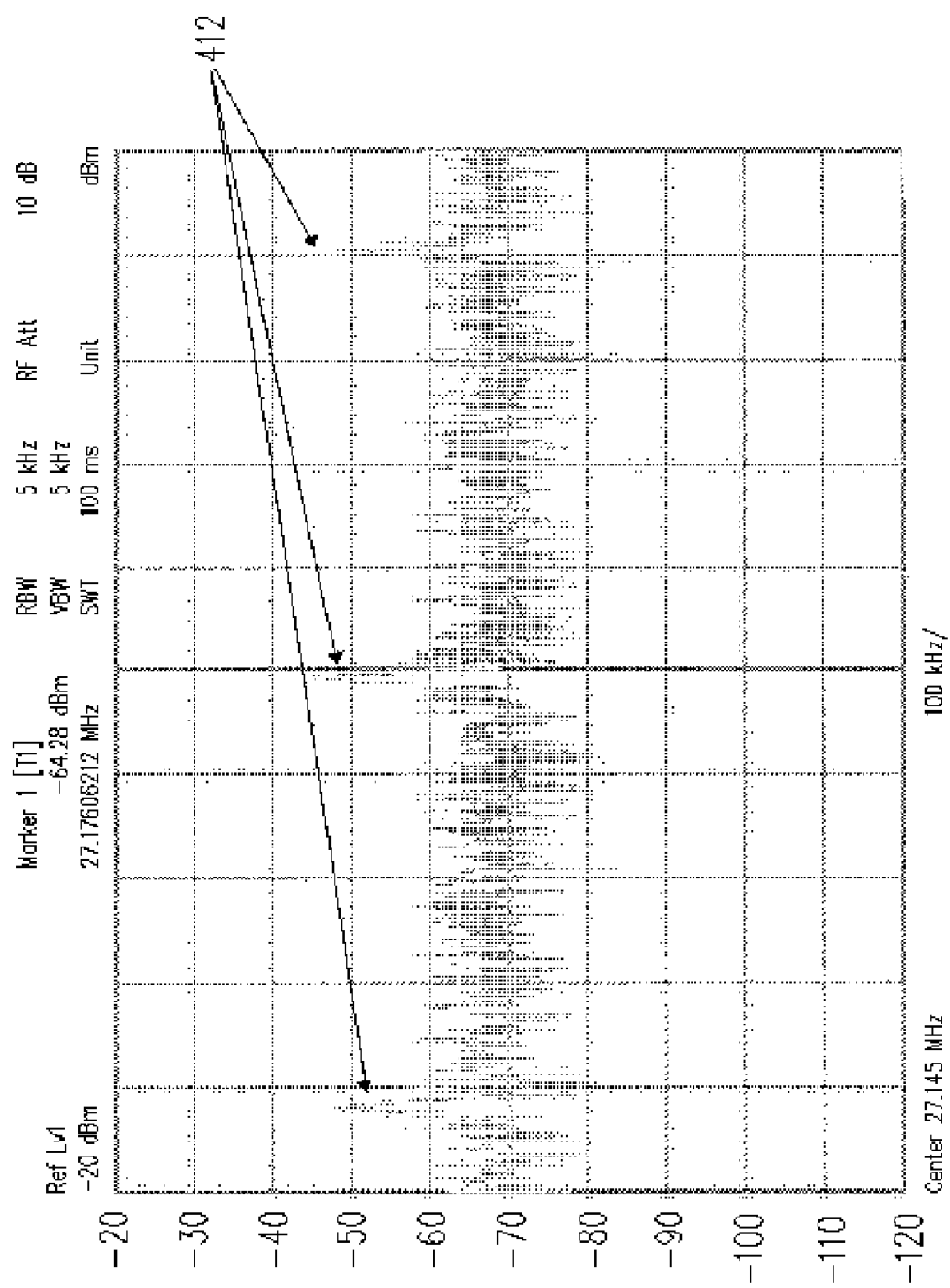
FIG. 4B is a configuration showing an overlapped area in a spectrum of a RF signal and a harmonic signal according to an embodiment of the present invention.

FIG. 4A is a configuration showing a spectrum of a RF signal and a base noise according to an embodiment of the present invention. FIG. 4B is a configuration showing an overlapping area of a spectrum of a RF signal and a harmonic signal according to an embodiment of the present invention. FIG. 5 is a configuration showing a testing result of a RF receiver according to an embodiment of the present invention.

In this embodiment, FIG. 5 shows the testing results of sensitivity of the RC receiver with frequency-hopping and without frequency-hopping. The RF signal has a 49.86-MHz frequency, QNCH is a digital clock, and the harmonics 1 and 2 are the harmonic signals closest to the RF signal. The QNCH generates a 1-KHz frequency-hopping. The Nth harmonic has an N-KHz frequency-hopping. In this test, N is 134 and 115. The spectrum in FIG. 4A shows the non-collision situation, wherein 402 represents the RF signal, and 404 represents the harmonic of the base noise. As shown, the harmonic does not overlap with the RF signal. That is, the decoding circuit 106 in FIG. 1A can distinguish the RF signal. As shown in row 5 and 6 of FIG. 5, the frequency-hopping does not affect the sensitivity of the RF receiver.

When collision 412 occurs as shown in FIG. 4B, the RF signal is moved to overlap with the harmonic signal due to the frequency-hopping. As shown in row 8 and 9 of FIG. 5, due to the frequency-hopping of the present invention, the sensitivity of the RF receiver can be improved almost to a situation when no collision occurs.

Figure 6A:
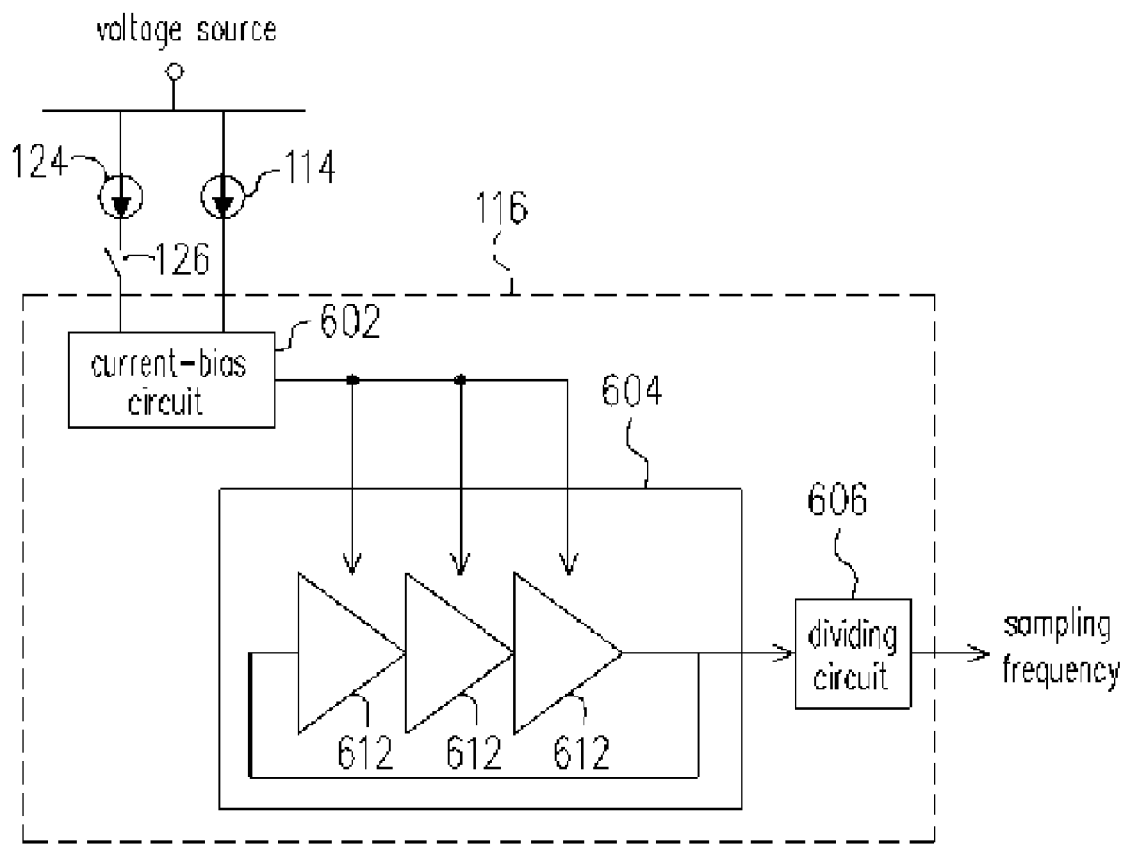
FIG. 6A is a schematic configuration showing a ring oscillating circuit according to an embodiment of the present invention.

FIG. 6A is a schematic configuration showing a ring oscillating circuit 116 according to an embodiment of the present invention. The ring oscillating circuit 116 comprises a current-bias circuit 602, a current-control oscillating circuit 604 and a divider 606. One of ordinary skill in the art should understand that the current-control oscillating circuit 604 may comprise, for example, an odd number of inverters 612. The divider 606 may divide the frequency by 4 before outputting. The present invention, however, is not limited thereto.

Figure 6B:
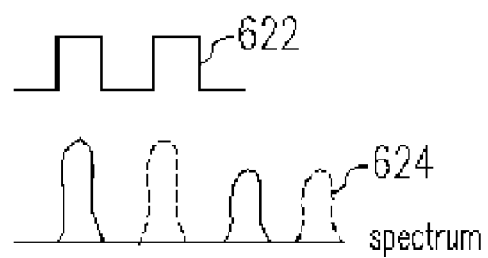
FIG. 6B is a configuration showing clock sequences of a frequency-hopping current and a sampling frequency according to an embodiment of the present invention.
Figure 7:
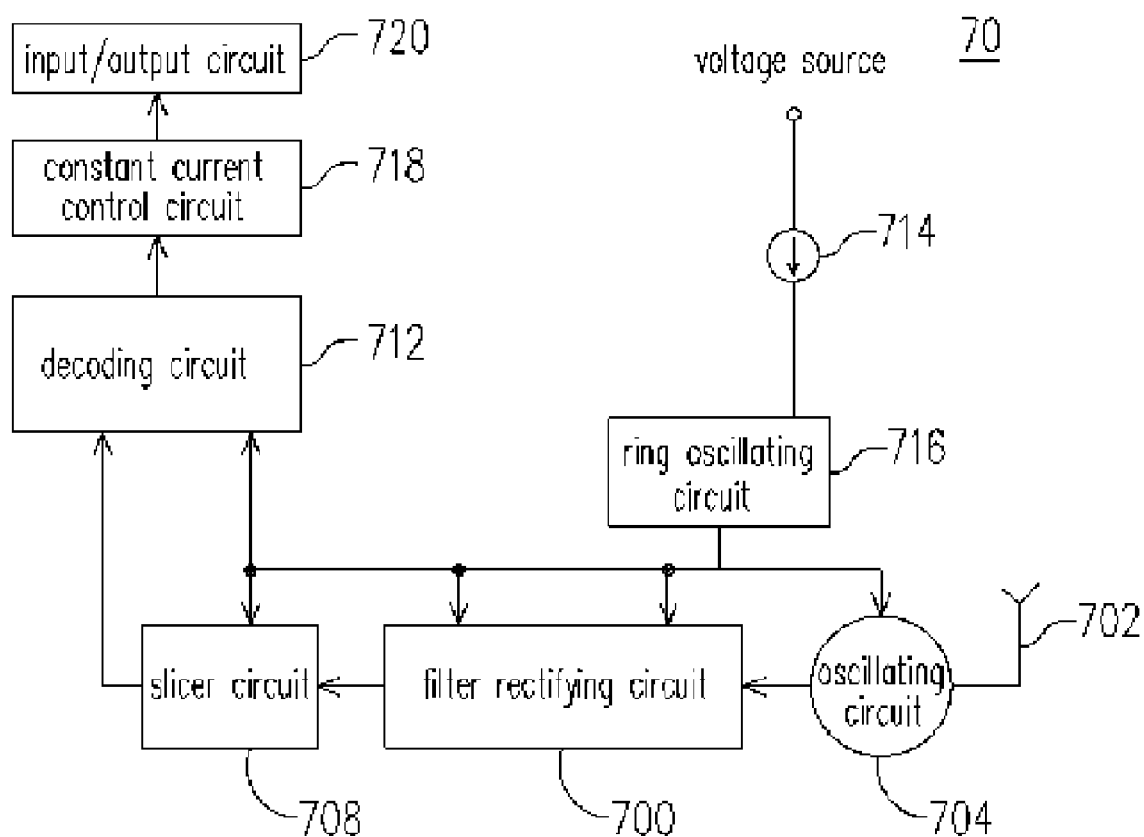
FIG. 7 is a schematic block diagram showing a circuit of a conventional RF receiver.

Referring to FIGS. 6A and 6B, the current-bias circuit 602 receives the frequency-hopping current and the constant current. The frequency-hopping current can be the form 622 as shown. Through the current-control oscillating circuit 604 and the dividing circuit 606, the sampling frequency is outputted. The output form can be the form 624 as shown.

Accordingly, by using the frequency-hopping, the RF receiver and the method of improving the sensitivity of the RF receiver in the present invention, generate a grate displacement for the harmonic frequency without affecting the base frequency so as to avoid the collision of the RF signal and the harmonic signal. In addition, the current controlling circuit prevents the heating issue of the chip resulting from the voltage driver I/O with low-loading resistance and high current consumption.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A radio-frequency (RF) receiver for receiving a RF signal, the RF receiver comprising:
    a sampling converting circuit for receiving a RF signal to sample and outputting a digital data;
    a decoding circuit electrically coupled to the sampling converter circuit, receiving the digital signal and comparing the digital data with a plurality of internal preset data in the decoding circuit, when the digital data is different from each of the preset data, outputting a frequency-hopping signal;
    a frequency-hopping circuit coupled to the decoding circuit, electrically coupled to the decoding circuit for outputting a frequency-hopping current while receiving the frequency-hopping signal;
    a constant current source for outputting a constant current; and
    a ring oscillating circuit electrically coupled to the frequency-hopping circuit and the constant current source, while receiving the frequency-hopping current, performing a frequency-hopping operation on the frequency-hopping current and the constant current to generate a frequency-hopped sampling frequency.

2. The RF receiver of claim 1, wherein the frequency-hopping circuit comprises:
    a frequency-hopping current source for outputting the frequency-hopping current; and
    a switch, while receiving the frequency-hopping signal, electrically coupled to the frequency-hopping current source and the ring oscillating circuit to transmit the frequency-hopping current to the ring oscillating circuit.

3. The RF receiver of claim 1, wherein the sampling converting circuit comprises:
    an oscillating circuit electrically coupled to the ring oscillating circuit, receiving the RF signal and the sampling frequency, performing a sampling operation on the RF signal according to the sampling frequency to output a trigger signal;
    a filter rectifying circuit electrically coupled to the oscillating circuit for filtering noises in the trigger signal; and
    a slicer circuit electrically coupled to the filter rectifying circuit and the decoding circuit for receiving the trigger signal and converting the analog trigger signal to the digital data for output.

4. The RF receiver of claim 3, wherein the filter rectifying circuit cumulates different trigger signals in every quench cycle.

5. The RF receiver of claim 1, wherein when the digital data is equivalent to one of the preset data, the decoding circuit outputs a control signal.

6. The RF receiver of claim 5, further comprising a current controlling circuit electrically coupled to the decoding circuit, outputting an operating current according to the control signal.

7. The RF receiver of claim 6, wherein the current controlling circuit receives the control signal and outputs the operating current from an output terminal thereof, and the current controller comprises:
    a first switch coupled to a voltage source;
    a second switch controlled by the control signal;
    a third switch;
    a first transistor, a gate terminal of the first transistor coupled to the first switch, a source terminal of the first transistor coupled to the voltage source, a drain terminal of the first transistor coupled to the output terminal of the current controlling circuit;
    a high-critical voltage inverter for receiving the control signal;
    a second transistor, a gate terminal of the second transistor coupled to the high-critical voltage inverter, a source terminal of the second transistor grounded, a drain terminal of the second transistor coupled to the output terminal of the current controlling circuit;
    a pulse circuit coupled to the third switch, generating a pulse signal to control the third switch so as to pulse output an amplified current; and
    a diode module electrically coupled to the gate terminal of the first transistor and the voltage source, the diode module comprising a plurality of diodes,
    wherein, the first switch and the second switch output currents according to the control signal.

8. The RF receiver of claim 1, wherein the ring oscillating circuit comprises:
    a current-bias circuit electrically coupled to the constant current source and the frequency-hopping circuit;
    an inverting circuit electrically coupled to the current-bias circuit, the inverting circuit comprising an odd-number of inverters; and
    a divider electrically coupled to the inverting circuit for outputting the sampling frequency.

9. The RF receiver of claim 1, wherein the frequency-hopping current is less than 1% of the constant current.

10. A method for improving sensitivity of a radio-frequency (RF) receiver, the RF receiver generating a sampling frequency according to a constant current, the method comprising:
    receiving a RF signal;
    sampling the RF signal according to the sampling frequency, converting the RF signal into a digital data;
    determining whether the digital data is equivalent to any of internal preset data;
    generating a frequency-hopping signal to transmit a frequency-hopping current when the digital data is different from each of the preset data; and
    performing a frequency-hopping operation on the frequency-hopping current and the constant current, outputting a frequency-hopped sampling signal.

11. The method for improving sensitivity of a RF receiver of claim 10, wherein the frequency-hopping current is less than 1% of the constant current.

12. The method for improving sensitivity of a RF receiver of claim 10, further comprising outputting a control signal when the digital data is equivalent to one of the preset data.

13. The method for improving sensitivity of a RF receiver of claim 10, further comprising outputting an operating current according to the control signal.

14. The method for improving sensitivity of a RF receiver of claim 10, wherein the RF signal is analog-type data.

15. The method for improving sensitivity of a RF receiver of claim 10, wherein the frequency-hopping signal changes frequency once every two data frames.

* * * * *